United States Patent
Prikas et al.

(10) Patent No.: US 6,890,388 B2
(45) Date of Patent: May 10, 2005

(54) APPARATUS AND METHOD FOR USING AN ACOUSTIC-JET FOR CLEANING HARD DISK DRIVE HEADS IN MANUFACTURING

(75) Inventors: Michael T. Prikas, North Valley Stream, NY (US); Theodore G. van Kessel, Millbrook, NY (US); Robert J. von Gutfeld, New York, NY (US); H. Kumar Wickramasinghe, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 10/042,852

(22) Filed: Jan. 7, 2002

(65) Prior Publication Data

US 2003/0127106 A1 Jul. 10, 2003

(51) Int. Cl.[7] .............................. B08B 7/04; B08B 3/12
(52) U.S. Cl. .............................. 134/1; 134/15; 134/34; 134/33; 134/127; 134/184
(58) Field of Search .............................. 134/1, 1.3, 15, 134/32, 33, 34, 67, 122 R, 124, 127, 130, 137, 184, 198, 199, 902

(56) References Cited

U.S. PATENT DOCUMENTS

| | | | | |
|---|---|---|---|---|
| 5,013,241 A | | 5/1991 | von Gutfeld et al. | |
| 5,368,054 A | * | 11/1994 | Koretsky et al. | 134/153 |
| 5,562,778 A | | 10/1996 | Koretsky et al. | |
| 5,745,946 A | * | 5/1998 | Thrasher et al. | 15/77 |
| 5,975,098 A | * | 11/1999 | Yoshitani et al. | 134/148 |
| 5,980,647 A | * | 11/1999 | Buker et al. | 134/33 |
| 6,003,527 A | * | 12/1999 | Netsu et al. | 134/1.3 |
| 6,497,240 B1 | * | 12/2002 | Kobayashi et al. | 134/64 R |
| 6,619,301 B2 | * | 9/2003 | Kobayashi et al. | 134/1.3 |
| 2001/0013355 A1 | * | 8/2001 | Busnaina | 134/1.3 |

* cited by examiner

*Primary Examiner*—Alexander Markoff
(74) *Attorney, Agent, or Firm*—Stephen C. Kaufman; Jon A. Gibbons; Fleit, Kain, Gibbons, Gutman, Bongini & Bianco P.L.

(57) ABSTRACT

A method of cleaning using an insonified, pressurized liquid to cleanse and then wash off particulates. The liquid is used to focus and direct the acoustical energy while enabling the trapping of the partials being cleaned and then used to wash off the partials. The acoustical frequency and power is described as optimized to be below the energy level to cause cavitation at the surface of the part being cleaned. The manufacturing process of loading, cleaning and unloading is also described. In another embodiment, a small amount of cavitation is acceptable if the cavitation is below a threshold in which shock waves occur.

24 Claims, 5 Drawing Sheets

APPARATUS AND METHOD FOR USING AN ACOUSTIC-JET FOR CLEANING HARD DISK DRIVE HEADS IN MANUFACTURING

BACKGROUND OF THE INVENTION

1. Field of the Invention

This invention generally relates to the field of cleaning of manufactured parts, and more particularly to an insonified liquid for cleaning objects formed from ceramic, especially those objects used in hard disk drives (HDD).

2. Description of the Related Art

Manufacturing parts made from alumina/TiC are formed using a ceramic material in a multi-layer ceramic panel or ceramic tile. Typically the size of the part being manufactured is smaller than the ceramic panel and it is common to form multiple copies of the parts from one ceramic panel. After the parts are formed, the ceramic panel is cut into the distinct parts. It is not uncommon to have over 10,000 individual hard disk drive heads (HDDH) cut from one ceramic panel. A sawing or laser cutting process is employed to cut the ceramic panel into distinct parts. During this cutting step, many times, the ceramic panel can fractures along the edge which has just been cut. The fracturing of the cut edge of ceramic part causes particulates to be dislodged. Accordingly, a need exists for a method of cleaning of the cut parts to remove particulates that may dislodge with time.

The use of cut parts from a ceramic panel with particulates dislodging is especially problematic in hard disk drive (HDD) applications. Particulate contamination can cause failures in the HDD assembly and greatly reduce the life of a HDD. Accordingly a need exists to assure cleanliness or absence of particulates which will assure high quality and reliability when ceramic parts are used for HDD.

One known process for manufacturing of hard disk drive heads (HDD) is a hot pressed sintering process. The material used to form the disk drive heads or "sliders" many times loosens and spills out onto the disk platter in the form of small particles. These particles are on the order of 1–2 microns in diameter. Numerous techniques have been tried to minimize the formation of particles from the HDD. For example, different ways of cutting the wafer include the use of a laser, a laser jet and other techniques. Generally, the standard method is to use diamond-cutting blades to saw the ceramic panel into individual heads. The cut edges of the HDDH are not polished or burnished after the final cuts are made on the ceramic panel in order to reduce the occurrence of particles. As mentioned above, these particles can lead to head crashes, which result in the temporary if not permanent destruction of the entire HDD. Therefore after manufacturing the HDDH are cleaned. Care must be taken not to stress the surface or edge of the ceramic panel cut pieces by techniques such as abrasion or cavitation. Prior art techniques for the cleaning of the HDDH includes compressed air and a cleaning wash. These cleaning techniques are useful but it should be noted they do not completely minimize the occurrences of particulates from becoming dislodged. It is important to note that the particulates being cleaned are typically small, on the order of a few microns. Moreover, it is also possible for the cleaning process to cause additional problems. If the cleaning process is too vigorous or too abrasive, surface damage and future particulate flaking can occur. Accordingly a need exists for a thorough cleaning process of the HDDH that does not promote the formation of dislodged particulates.

SUMMARY OF THE INVENTION

Briefly in accordance with the invention, a method and apparatus for cleaning micron size particulates off objects is described. The cleaning has been advantageously applied to ceramic materials, especially alumina/TiC, as used in hard disk drive head (HDDH) fabrication. Each object to be cleaned is held in a carrier for moving the objects along a processing assembly line. One or more surfaces of the objects in the carrier are cleaned with insonified liquid such as de-ionized water. The liquid is insonified as it is being sprayed so that a frequency and a power of the insonification are kept below a threshold above which cavitation occurs. In another embodiment, a small amount of cavitation is acceptable if the cavitation is below a threshold in which shock waves occur.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF AN EMBODIMENT

Figure 1:
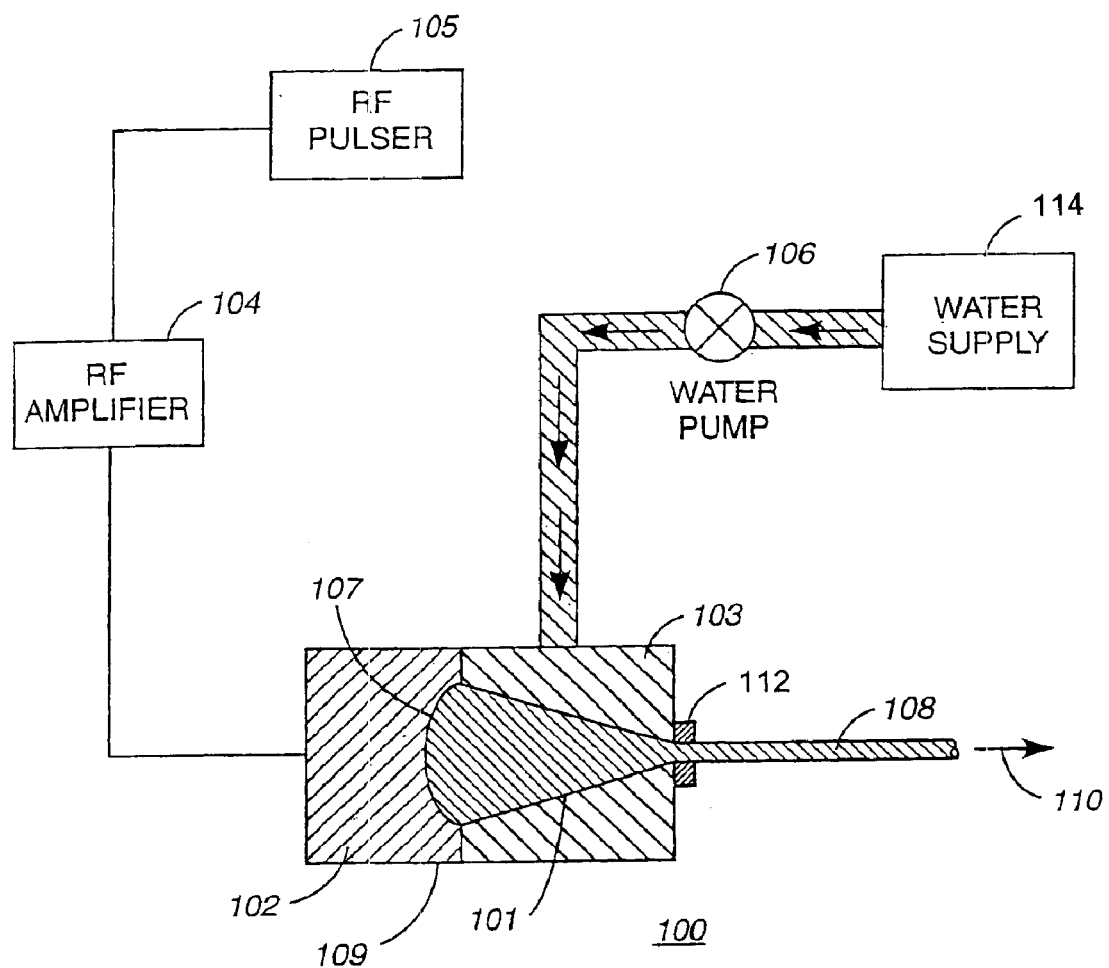
FIG. 1 is a functional block diagram of an acoustic liquid jet apparatus together with a focusing acoustic transducer as used in the present invention.

It is important to note, that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Description of the Process

The present invention utilizes an insonified, pressurized liquid jet stream to rinse one or more surfaces of an object to remove small particulates. The formation of particulates on objects made from ceramic such as alumina/TiC parts have been shown to be cleaned by the present invention. One such object which has been shown to advantageously be cleaned by the present invention is a hard disk drive head (HDDH) after the individual heads are cut from a ceramic panel in which they were formed.

The present invention provides a cleaning apparatus, which is compatible with the existing manufacturing processing lines. Several optional carriers for holding the HDDH are described in the present invention for moving small parts during cleaning. In one embodiment, a small object such as a HDDH is placed with a robotic manipulator in between two moving belts which acts like a conveyor to move the objects through the insonified jet stream cleaning process. After being subject to the insonified liquid jet stream, the belts are released and a second robot picks up the HDDH and places onto the next holder or belt for further assembly, for example attachment to the pickup arm. If four surfaces are to be cleaned, that is, the two saw cut edges and the air bearing surface and its opposing surface, a second holder is used, this time clamping the cut sides and exposing the air bearing surface and the opposing surface to the insonified jet. Robotics are used to transfer the HDDH samples onto and from this second belt system.

The insonified jet consists of a liquid such as DI (de-ionized) water that is forced into a nozzle. At the same time the jet is insonified by a focusing transducer, which imparts acoustic energy into the jet nozzle. The use of a liquid has several advantages over air. To begin, using a liquid provides higher acoustic energy during the cleaning process because of the viscosity of liquid as compared with air. Moreover, a liquid acts to trap any particles being washed away using the insonified jet. In contrast, many times the use of insonified air alone simply moves the particle from one area of the HDDH to another.

In one embodiment, the present invention uses an acoustic frequency transmitted through a water jet that is on the order of one to several MHz. In liquid it has been shown through experimentation that high frequencies (MHz) are much less likely to cause cavitations than low frequencies (KHz) for a given acoustic power density. Cavitation occurs when an air bubble is formed and then collapses in a liquid due to ultrasound. The collapse of a bubble can cause a shock wave in the material undergoing cleaning at KHz frequencies which is the typical frequencies used by conventional ultrasonic cleaners. Accordingly, higher acoustic power is possible, without resulting in cavitation of the surface material being cleaned when the frequency of insonification is raised above the 1 MHz range.

Cavitation used when cleaning the ceramic parts is often undesirable. The shock waves resulting from cavitation often times cause further dislodging of ceramic particles. In addition, shock waves are also know to cause low level stress cracks. Therefore the present invention mitigates the occurrence of substantial cavitation while at the same time maximizing the acoustic power density which aides in cleaning the surface ceramic parts by dislodging any loose particles residing near the surface without cavitation. In another embodiment, a small amount of cavitation is acceptable as long as it is below a threshold which shockwaves occur.

In order to achieve this balance of reducing or eliminating cavitation while simultaneous maximizing power several experiments have been run. It has been determined that the power/area required to cause cavitation at 1 kHz is approximately three orders of magnitude less than power/area required at 1 MHz. Accordingly it is possible to insonify the a liquid jet with high frequency (MHz) acoustic power to a much higher power density without causing significant cavitation. For example, some known cleaning devices advertise acoustic power densities on the order of 25 W/cm$^2$ while with the present invention the power density within the jet stream can be on the order of 5 kW/cm$^2$. At this power density level it is efficient to run the transducer continuously. In contrast, many commercially ultrasonic cleaners only support a pulse mode. Moreover, many of these commercially available cleaners operate at much tower power densities and at lower frequencies.

Description of the Apparatus

FIG. 1 is a functional block diagram of an acoustic liquid jet apparatus 100 together with a focusing acoustic transducer as used in the present invention. The acoustic liquid jet apparatus is also known in the art as an acoustic jet cell or acoustic jet module. One acoustic liquid jet apparatus 100 shown to work advantageously with the present invention is ETALON™ focusing transducer at 7.8 MHz. The function of the acoustic liquid jet apparatus 100 is to emit, under hydrostatic pressure, a line liquid spray 108 such as de-ionized water through a nozzle 112 while at the same time becoming insonified by a high frequency, high intensity ultrasonic wave. The acoustic liquid jet apparatus 100 as is known in the art is shown together with its ancillary equipment. The acoustic RF transducer 102 is mounted within the acoustic jet module 109. The concave curvature 107 of the front of RF transducer 102 gives rise to a focused ultrasonic beam 101 directed into a nozzle 112, which also is the exit point for the liquid jet. The insonified liquid 108 is exiting the transducer in the direction 110. Shown also are a water supply 114, water pump 106 and the water 103 within the acoustic liquid jet apparatus 100. An RF pulser 105 provides the appropriate acoustic frequency to transducer 102 after amplification by an RF amplifier 104. The device shown in FIG. 1 is used in conjunction with a special manufacturing line described below.

Description of Dual Belts

Figure 2A:
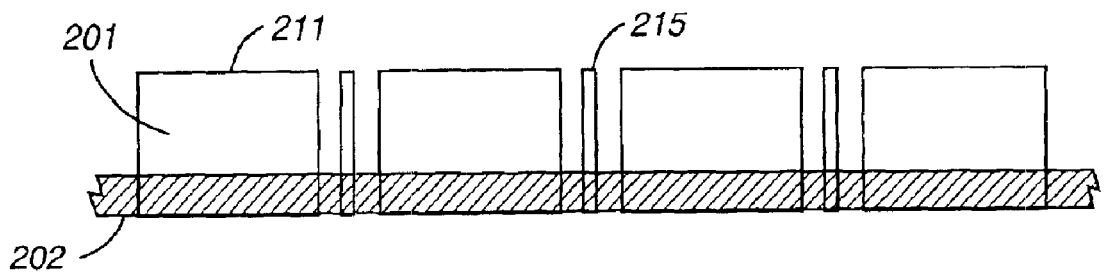
FIG. 2A is a side view of a belt used to hold small objects such as a hard disk drive head (HDDH) with one lateral edge exposed for cleaning by the acoustic liquid jet apparatus of FIG. 1, according to the present invention.

FIG. 2A is a side view of a belt used to hold small objects 201 such as hard disk drive heads (HDDH), with one lateral edge 211 exposed for cleaning by the acoustic liquid jet apparatus of FIG. 1, according to the present invention. The individual objects 201, are loaded onto a belt 202. In one embodiment, where the part is a HDDH, the size is typically on the order of 1 mm×1 mm×0.3 mm. As illustrated the cut edge 211 faces up towards the top of the diagram and a similar cut edge 212 here facing down, opposite 211. An optional spacer 215 is used to keep a uniform separation distance between the individual objects 201.

Figure 2B:
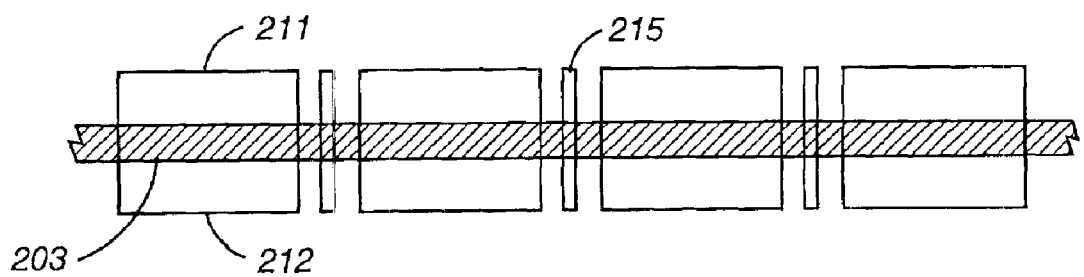
FIG. 2B is a side view of an alternate embodiment of a belt used to hold small objects such as a hard disk drive head (HDDH) with two lateral edges exposed for cleaning by the acoustic liquid jet apparatus of FIG. 1, according to the present invention.

FIG. 2B is a side view of an alternate embodiment of a belt used to hold a small objects such as a hard disk drive head (HDDH) with two lateral edges 211 and 212 exposed for cleaning by the acoustic liquid jet apparatus of FIG. 1, according to the present invention. The objects 201 are held between two belts 203 and 209 (shown in FIG. 2C) on opposite faces to hold them in place while the loading holder is removed thereby exposing the two opposite edges.

Figure 2C:
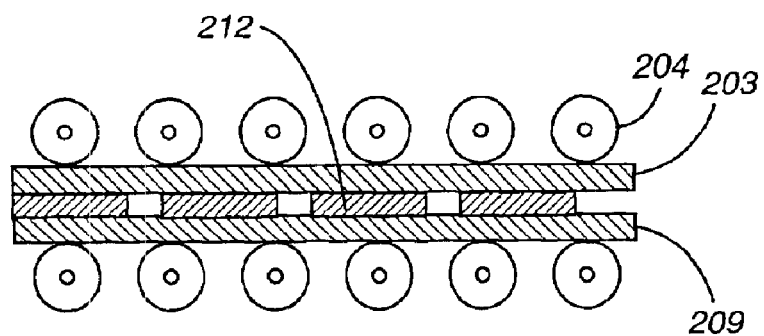
FIG. 2C is a top view of the belts of FIGS. 2A and 2B illustrating rollers for moving the belts which grasp the objects to be cleaned, according to the present invention.

FIG. 2C is a top view of the belts of FIGS. 2A and 2B illustrating rollers or spring loaded wheels 204 for moving the belts 202 and 203 which grasp the objects to be cleaned, according to the present invention. It should be understood that this assembly shown in FIGS. 2A, 2B, and 2C provides for a continuous line of objects 201 loaded onto belts 203 and 209, thus allowing all of the objects 201, such as HDDHs, to move in a conveyor belt fashion while being cleaned by one or more insonified jets of the type shown in FIG. 1.

Diagram of the Insonified Spray into a Moving Belt

Figure 3:
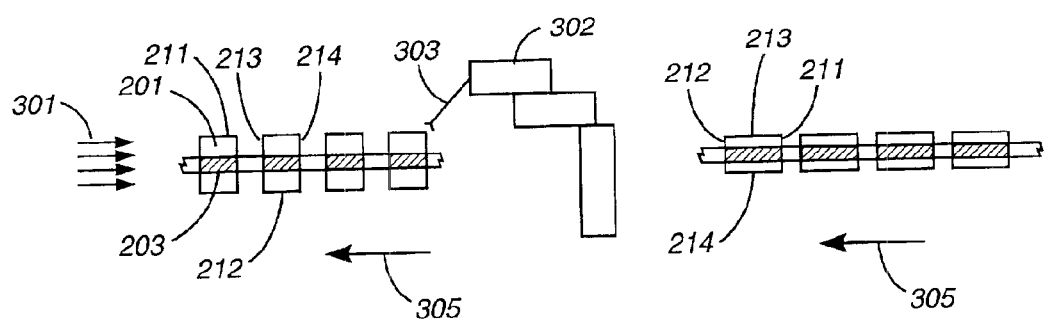
FIG. 3 is a function block diagram of an insonified spray of the acoustic jet water apparatus of FIG. 1 being applied to one or more parts being held on a belt of FIG. 2, according to the present invention.

FIG. 3 is a function block diagram 300 of an insonified spray of the acoustic jet water apparatus of FIG. 1 being applied to one or more parts being held on a belt of FIG. 2, according to the present invention. Illustrated is an insonified jet stream 301 moving left-to-right, while the series of objects 201 being moved by way of a belt 203 from right-to-left 305. In one embodiment, the insonified jet stream 301 and the objects 201 are moving in the opposite direction. In another embodiment, the insonified jet stream 301 and the objects 201 are moving in the same direction. It should be understood that two opposite surface pairs 211, 212, and 213, 214 are cleaned with this apparatus.

In order to clean two additional opposite faces of the objects, for example if surface pairs 213, 214 are initially cleaned then surface pairs 211, 212 are cleaned as follows. A robot 302 with a manipulator 303 unloads the samples from die belt 203 and loads the objects 201 at right angles (i.e., 90 degree rotation) from the previous belts which now grasp the objects 201 along the two surfaces. In this orientation, the ultrasonic jet can clean the surface 211 and its opposite surface 214. For another embodiment, as understood by those of average skill in the art, an additional acoustic jet such as that shown in FIG. 1 is positioned to access the surface pairs 213, 214.

Diagram of the Insonified Spray from a Rotating Axis

Figure 4:
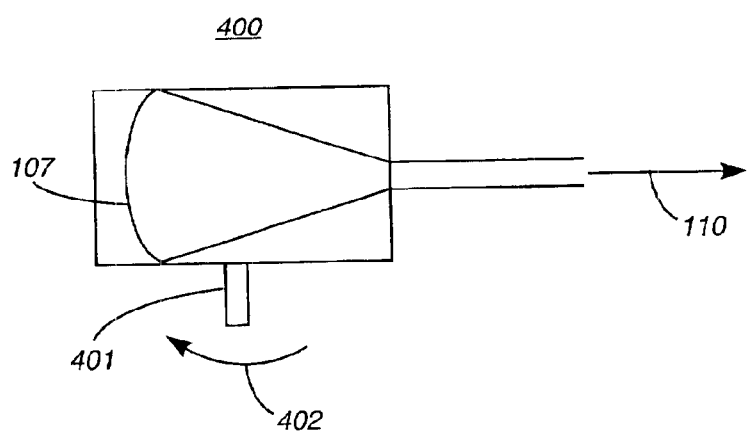
FIG. 4 is a functional block diagram of an alternate embodiment of an acoustic liquid jet apparatus of FIG. 1 with a rotatable mount to permit the insonified spray angle to be modified, according to the present invention.

FIG. 4 is a functional block diagram 400 of an alternate embodiment of an acoustic liquid jet apparatus 100 of FIG. 1 with a rotatable mount or gimbals 401 to permit the angle of insonified jet stream 109 to be modified through rotation 402, according to the present invention. The ability to rotate the acoustic liquid jet apparatus 100 permits the degree of longitudinal and shear waves that impinge the surfaces of object 201 to be changed. Generally when a longitudinal wave impinges upon a solid surface at oblique or non-normal angle of incidence there are two transmitted waves one longitudinal and one transverse. In one embodiment enabling the acoustic liquid jet apparatus 100 to rotate with respect to the objects 201. This permits the angle of the insonified jet stream 109 to be varied. Therefore the longitudinal and shear waves can be adjusted so as to optimize the cleaning as a possible mode of operation.

Diagram of the Use of Two Acoustic Jets

Figure 5:
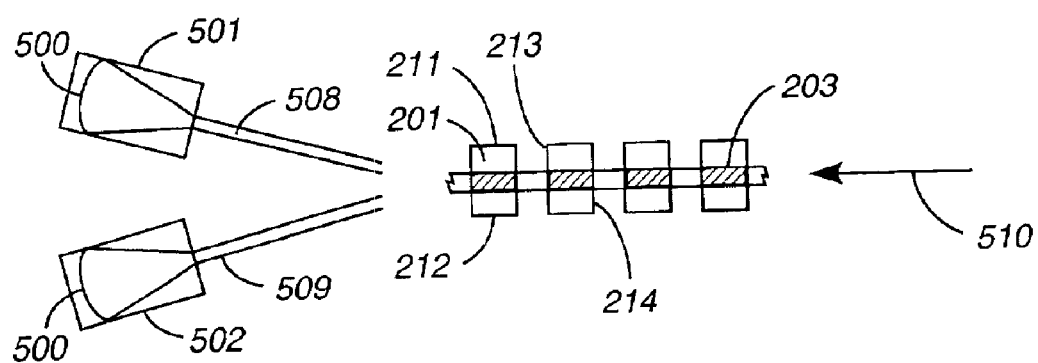
FIG. 5 is a function block diagram of an alternate embodiment of the FIG. 3 with multiple acoustic liquid jet apparatus of FIG. 1, according to the present invention.

FIG. 5 is a function block diagram 500 of an alternate embodiment of the FIG. 3 with multiple acoustic liquid jet apparatus 101 of FIG. 1, according to the present invention. In this embodiment two acoustic jets 501 and 502 are shown emitting insonified liquid stream 508 and 509 respectively. Each of the insonfied jet streams 509 and 508 are directed at two opposite surfaces 211 and 212 of the objects 201 as they progress down the belt driven conveyor line 203. Here, the objects 201 are moving in a direction 510 opposite to that of the insonified liquid stream 508 and 509 for maximum cleaning efficiency.

Diagram of the Insonified Spray from Various Angles

Figure 6:
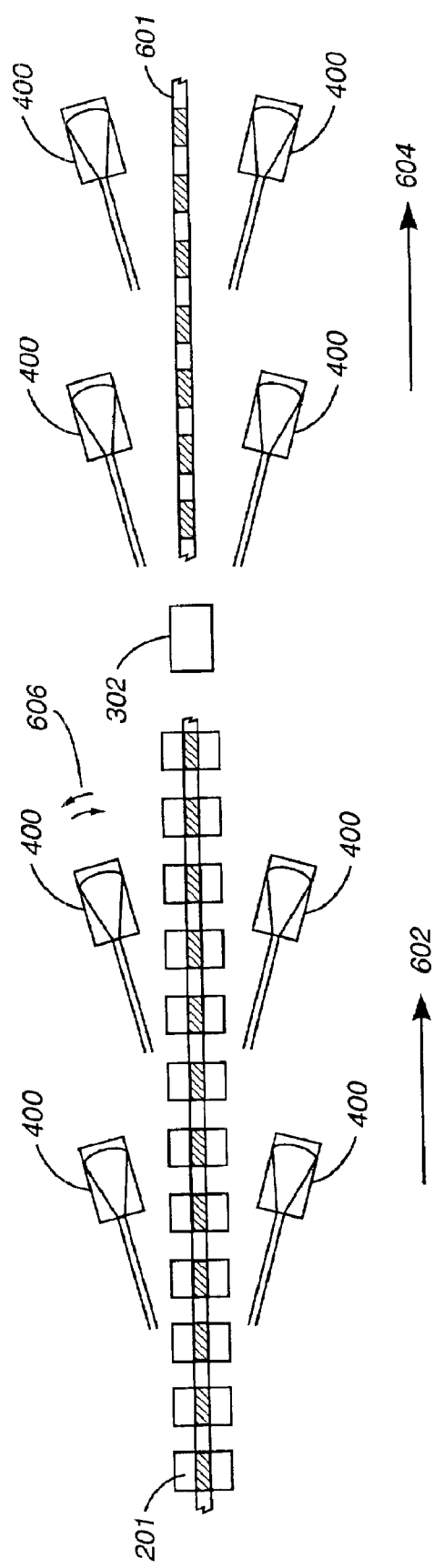
FIG. 6 is a functional block diagram of the acoustic liquid jet apparatus of FIG. 4 illustrating a typical assembly line for cleaning objects 201 at multiple spray orientations.

FIG. 6 is a functional block diagram 600 of the acoustic liquid jet apparatus of FIG. 4 illustrating a typical assembly line for cleaning objects 201 at multiple spray orientations. The acoustic liquid jet apparatus 400 are aimed at various angles with respect to the objects 201 mounted at two right angle directions as shown. Samples 201 are shown with the cut edge facing in the vertical direction as well as in the horizontal direction and are rotated using the robot 302 as described in FIG. 3.

Non-Limiting Examples

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for cleaning one or more surfaces of an object, the method comprising:

placing an object to be cleaned on a conveyor comprising at least two belts, wherein the object includes a front surface, a back surface, a first lateral edge and a second lateral edge, so that a first of the two belts is in frictional contact with a portion of the front surface of the object and a second of the two belt is in frictional contact with a portion of the back surface of the object while simultaneously exposing at least a portion of the first lateral edge and the second lateral edge for cleaning;

spraying a liquid through at least one jet onto at least one surface of at least one object to be cleaned; and insonifying the liquid, with a focusing acoustic transducer, as it is being sprayed, producing longitudinal and shear waves which propagate into the object itself with an acoustic power divided by an area (acoustic power/area), which is a function of an amount of electric power applied to the focusing acoustic transducer at a given frequency to result in the liquid with an insonified power density without substantial cavitation occurring on a surface of an object being cleaned.

2. The method according to claim 1, wherein the liquid being sprayed is insonified at a frequency equal to 1 MHz.

3. The method according to claim 1, wherein the liquid being sprayed is insonified at a frequency greater than 1 MHz.

4. The method according to claim 1, further comprises:

moving the object in a direction substantially opposite relative to a direction of the spray so as that any particulates cleaned from the at least one surface are cleaned in a direction opposite the direction in which the object is moving.

5. The method according to claim 1, further comprises:

moving the jet in a direction substantially opposite to a direction of the spray so as that any particulates cleaned from the at least one surface are cleaned in a direction of the spray.

6. The method according to claim 1, wherein the step of spraying a liquid includes spraying a liquid at an oblique angle relative to the at least one surface of an object to be cleaned.

7. The method according to claim 1, wherein the step of spraying a liquid spray includes spraying a liquid which is de-ionized water.

8. The method according to claim 1, wherein the step of insonifying the liquid includes producing an acoustical wave imparted onto the surface of the one or more objects being cleaned in a directions away from the focusing acoustic transducer.

9. The method according to claim 1, wherein the conveyor comprises at least one spacer between the first belt and the second belt to maintain a predefined separation distance between the belts.

10. The method according to claim 1, wherein the step of spraying a liquid includes spraying a liquid onto at least one surface of at least one object which it made from ceramic.

11. The method according to claim 9, wherein the step of spraying a liquid includes spraying a liquid onto at least one surface of at least one object which is made from alumina/TiC.

12. The method according to claim 1, wherein the step of spraying a liquid includes spraying a liquid onto at least one surface of at least one object which is a hard disk drive head.

13. The method according to claim 1, further comprising the step of placing the first and second belts in motion by applying force from a plurality of spring-loaded wheels.

14. The method according to claim 1, further comprising:
    moving the object in substantially the same relative direction as the spray so as that any particulates cleaned from the at least one surface are cleaned in a direction in which the object is moving.

15. An apparatus for cleaning objects using insonified liquids the apparatus comprising:
    a carrier that moves one or more objects along a processing assembly line for cleaning, the carrier comprising at least two belts, wherein each object includes a front surface, a back surface, a first lateral edge and a second lateral edge, so that a first of the two belt is in frictional contact with a portion of the front surface of the object and a second of the two belts is in frictional contact with a portion of the back surface of the object while simultaneously exposing at least a portion of the first lateral edge and the second lateral edge for cleaning; and
    a focusing acoustic transducer with at least one jet for spraying a liquid onto at least one of the lateral edges of the objects to be cleaned, wherein the liquid is insonified while it is being sprayed and the focusing acoustic transducer provides an acoustic power divided by an area (acoustic power/area) that is a function of an amount of electric power applied to the focusing acoustic transducer at a given frequency to result in the liquid with an insonified power density without substantial cavitation occurring on the at least one lateral edge of the object being cleaned.

16. The apparatus for cleaning objects according to claim 15, wherein the focusing acoustic transducer is operated at a frequency greater than or equal to 1 MHz.

17. The apparatus for cleaning objects according to claim 15, wherein the object is made from ceramic.

18. The apparatus for cleaning objects according to claim 15, wherein the object is made from alumina/TiC.

19. The apparatus for cleaning objects according to claim 15, wherein the object is a hard disk drive head (HDDH).

20. The apparatus for cleaning objects according to claim 15, wherein the object is a hard disk drive head (HDDH) with a plurality of lateral edges, and wherein the carrier is configured to be rotatable so at least four lateral edges are cleaned by the liquid being sprayed from the jet.

21. The apparatus for cleaning objects according to claim 15, wherein the focusing acoustic transducer is rotatably mounted so as to vary at least one of a longitudinal component and a shear wave component of on acoustic wave produced by the focusing acoustic transducer.

22. The apparatus for cleaning objects according to claim 15, wherein the focusing acoustic transducer is mounted on a robotic aim to permit a direction that the jet for spraying a liquid onto the surface of the one or more objects to be adjusted relative to the surface of the one or more objects.

23. The apparatus for cleaning objects according to claim 15, further comprising:
    at least one spacer provided between the first belt and the second belt, the spacer for maintaining a predefined separation distance between the belts.

24. The apparatus for cleaning objects according to claim 15, further comprising:
    a plurality of spring-loaded rollers in physical communication with at least one of the first belt and the second belt, the rollers applying a displacing force to the at least one belt.

* * * * *